Jan. 4, 1938.  K. ROSENBAUM  2,104,101

JOINTED COUPLING

Filed June 26, 1937

Inventor
Kurt Rosenbaum
by Knight Bros
Attorneys

Patented Jan. 4, 1938

2,104,101

UNITED STATES PATENT OFFICE 2,104,101

JOINTED COUPLING

Kurt Rosenbaum, Rheinhausen/Lower Rhine, Germany, assignor to Fried. Krupp Aktiengesellschaft, Essen-on-the-Ruhr, Germany Application June 26, 1937, Serial No. 150,431 In Germany July 3, 1936

4 Claims. (Cl. 64—16)

This invention relates to jointed couplings intended for the transmission of power between revolving parts in particular in the drive of rolls, and comprising a coupling head and a link neck or journal. In devices of this type it is frequently important to keep within certain limits both the dimensions of the interengaging parts of the revolving members and the surface pressures occurring in the transmission of power between these parts. So, for example, with the above-mentioned couplings employed in the drive of rolls the necessity arises more and more to keep the dimensions of the roll neck or pinion neck within the diameter of the bearings. From this measure, however, result comparatively small surfaces which have only small distance from the axis of rotation, so that the surface pressures exceed the amount which can be admitted for the material, especially for red brass which is used here in the most cases. On the other hand it is frequently impossible to make the diameter of the pinion necks greater. This is the case first of all where the rolls are to be supported by antifriction bearings.

The primary object of the invention is a coupling of the type described which is very simple in construction, comprises but little parts and is remarkable for the fact that the pressure-transmitting surfaces are as large as possible and are as distant as possible apart from the axis of rotation. The invention primarily consists in the feature that two link members are provided which can revolve within the coupling shell each about an axis normal to that of the other link member, and that both these link members have an external pressure-transmitting surface cylindrically curved about the axis of rotation of the respective link member, one of these members being mounted directly in the coupling shell, while the other is mounted within the former link member and carries the link journal.

Figure 1:
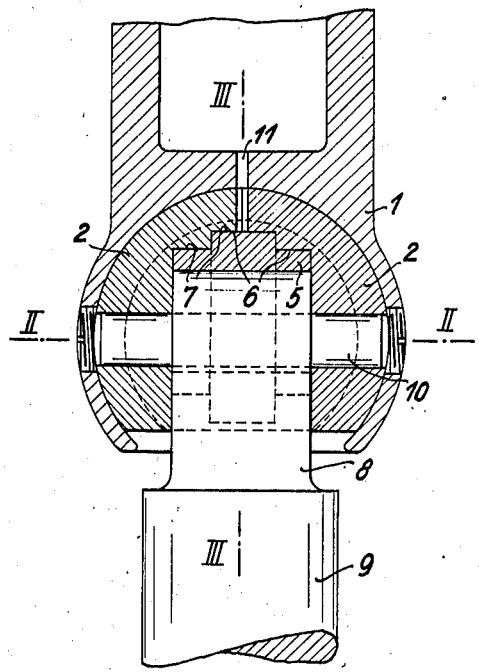
Figure 3:
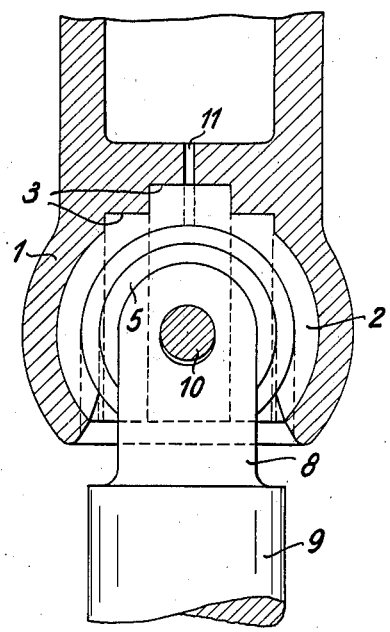
Figure 2:
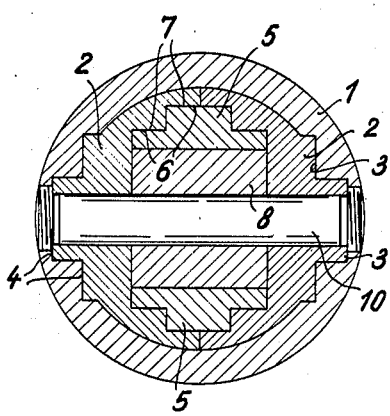

In order that the invention may be clearly understood and readily carried into effect, an embodiment of the same is illustrated by way of example in the accompanying drawing in which Figure 1 shows a coupling constructed according to the invention and intended for the drive of rolls, partly in elevation and partly in central longitudinal section, Figure 2 is a section on the line II—II of Figure 1, and Figure 3 is a section on the line III—III of Figure 1.

Referring to this drawing, I denotes the hollow head or shell of the coupling which has an almost spherical shape and is nearly closed. In the shell 1 is immediately mounted an about spherical link member 2 in such a manner that it can turn merely about an axis extending transversely of the central longitudinal axis of the shell 1. This arrangement is obtained by the provision of an external bearing surface 3 provided on the link member 2 and advantageously having several stepped offsets. This stepped supporting surface is cylindrically curved about the axis of rotation of the link member 2 and rests and can slide on a correspondingly stepped abutment 4 of the shell 1. In order to facilitate the introduction of the link member 2 into the shell 1, the former is made in two parts facing one another in the direction of the plane of section III—III of Figure 1.

In the link member 2 is immediately mounted another link member 5 of about horseshoe-like configuration in such a manner as to be capable of turning only normally to the axis of rotation of the link member 2. The link member 5 is mounted in the link member 2 in a manner exactly corresponding to that in which the latter is mounted in the shell 1, viz, by an external cylindrical stepped supporting surface 6 of the link member 5 which surface is curved about the axis of rotation of the latter, resting and sliding on a correspondingly shaped supporting surface 7 provided in the link member 2. In the link member 5 is lodged the extremity 8 of a coupling journal 9 the free end of which extremity is cylindrically curved symmetrically to the link member 5, the extremity 8 being of rectangular cross section so that the journal 9 cannot turn relatively to the member 5.

Between the extremity 8 of the coupling journal 9 and the link member 2 is established further a connection by means of a smooth bolt 10 which however, is not necessary at any rate. The bore in the extremity 8 of the journal 9 for the bolt 10 is somewhat oblong, in order to keep the bolt as far as possible free of shearing forces.

As it will be evident from the foregoing, the described structure of a jointed coupling according to the invention affords various remarkable advantages. The number of vital parts of the coupling is very small. The parts themselves can have a very strong and resistant construction. In consequence of the cylindrical curvature of the bearing surfaces of the link members the pressure-transmitting surfaces are displaced as far as possible apart from the axis of rotation of the coupling and the greatest possible extension of these surfaces is obtained as well as plane pressure-transmitting surfaces which would rub against one another are avoided as far as possible. The compressive load exerted upon the unit of area is reduced to a great extent. Finally, the possibility of giving the coupling the mentioned enclosed construction enables application of pressure oil feed, without that losses of oil worth mentioning are to be feared. In such an arrangement the oil may be supplied to the friction places through a central passage 11 provided in the shell 1 and link member 2, see Figures 1 and 2.

What I claim and desire to secure by Letters Patent is:—

1. A coupling of the class described comprising a shell rigid to one of the parts to be coupled, a journal on the other part to be coupled, a link member immediately lodged in said shell and having a pressure-transmitting surface, a companion surface in said shell co-operable therewith, another link member immediately lodged in said first-named link member and having said journal rigid to it and having a pressure-transmitting surface, a companion surface in said first-named link member co-operable therewith, the axes of rotation of said two link members extending normally to one another, said pressure-transmitting surfaces being cylindrically curved about the axis of rotation of the respective link member.

2. A coupling of the class described comprising a shell rigid to one of the parts to be coupled, a journal on the other part to be coupled, a link member immediately lodged in said shell and having a pressure-transmitting surface, a companion surface in said shell co-operable therewith, another link member immediately lodged in said first-named link member and having said journal rigid to it and having a pressure-transmitting surface, a companion surface in said first-named link member co-operable therewith, the axes of rotation of said two link members extending normally to one another, said pressure-transmitting surfaces being cylindrically curved about the axis of rotation of the respective link member and consisting of several step-like offset sub-surfaces.

3. A coupling of the class described comprising a shell rigid to one of the parts to be coupled, a journal on the other part to be coupled, a link member immediately lodged in said shell and having a pressure-transmitting surface, a companion surface in said shell co-operable therewith, another link member immediately lodged in said first-named link member and having said journal rigid to it and having a pressure-transmitting surface, a companion surface in said first-named link member co-operable therewith, the axes of rotation of said two link members extending normally to one another, said pressure-transmitting surfaces being cylindrically curved about the axis of rotation of the respective link member, said link members and said journal having dimensions such as almost completely filling the hollow space of said shell.

4. A coupling of the class described comprising a shell rigid to one of the parts to be coupled, a journal on the other part to be coupled, a link member immediately lodged in said shell and having a pressure-transmitting surface, a companion surface in said shell co-operable therewith, another link member immediately lodged in said first-named link member and having said journal rigid to it and having a pressure-transmitting surface, a companion surface in said first-named link member co-operable therewith, the axes of rotation of said two link members extending normally to one another, said pressure-transmitting surfaces being cylindrically curved about the axis of rotation of the respective link member, said link members and said journal having dimensions such as almost completely filling the hollow space of said shell, a central passage in said shell and a co-axial passage in said first-named link member, said passages being adapted for the supply of oil under pressure to the parts lodged in said shell.

KURT ROSENBAUM.